Nov. 13, 1962  C. BERGUERAND  3,063,194
MINIATURE TOY MOTOR VEHICLES AXLE ARRANGEMENT
Filed Oct. 27, 1960  2 Sheets-Sheet 1
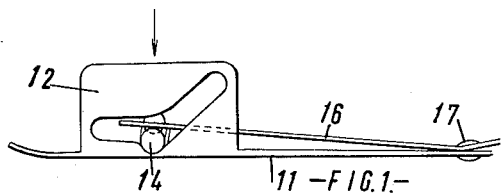
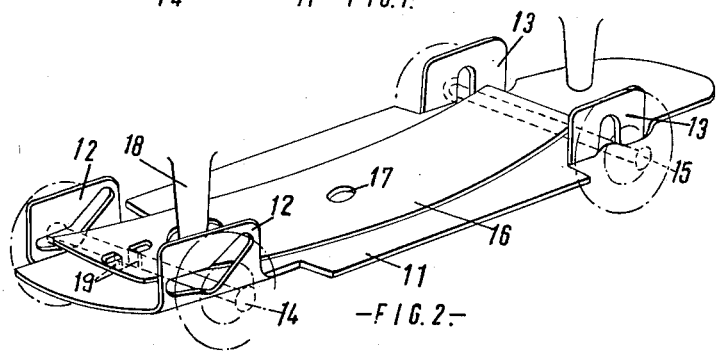
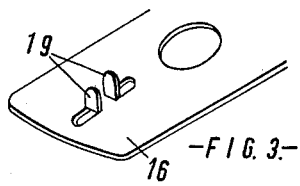
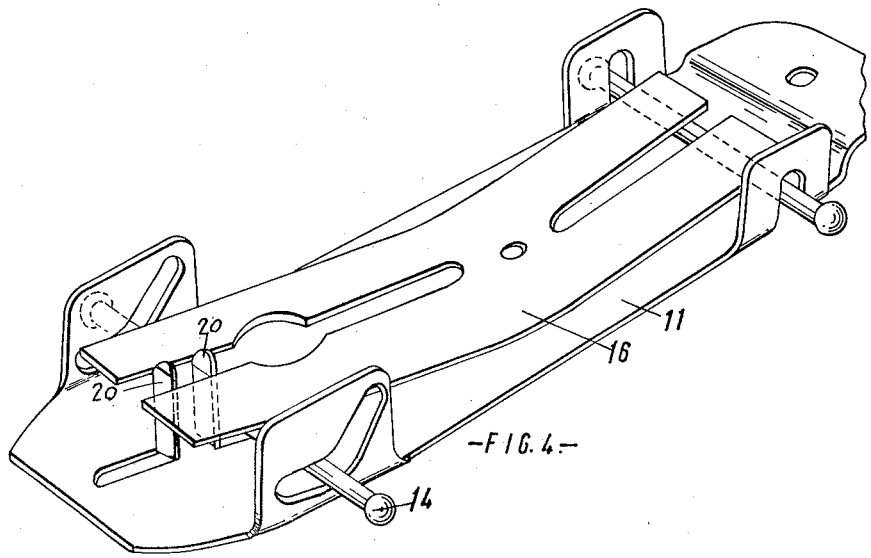
Inventor
CLAUDE BERGUERAND
By Robert C. Comstock
ATTORNEY Nov. 13, 1962 C. BERGUERAND 3,063,194
MINIATURE TOY MOTOR VEHICLES AXLE ARRANGEMENT
Filed Oct. 27, 1960 2 Sheets-Sheet 2
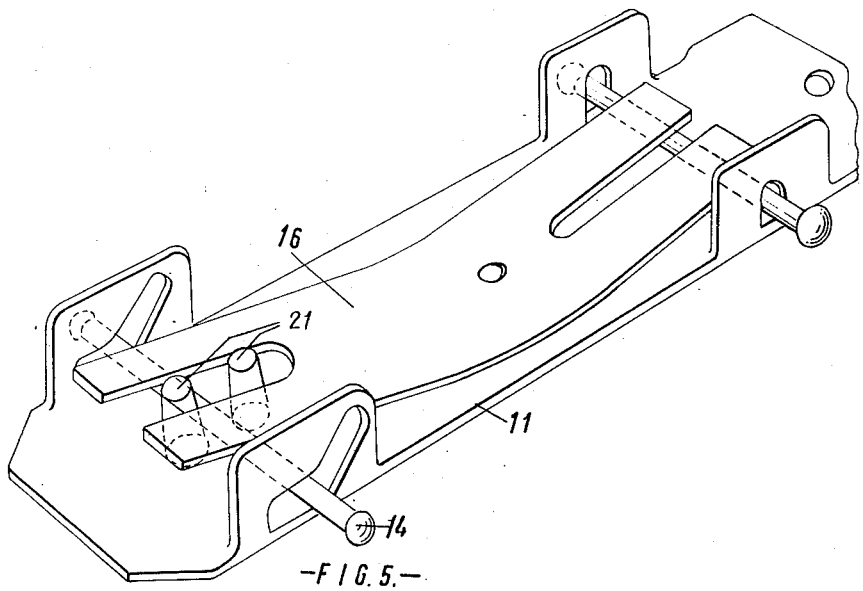
—FIG. 5.—
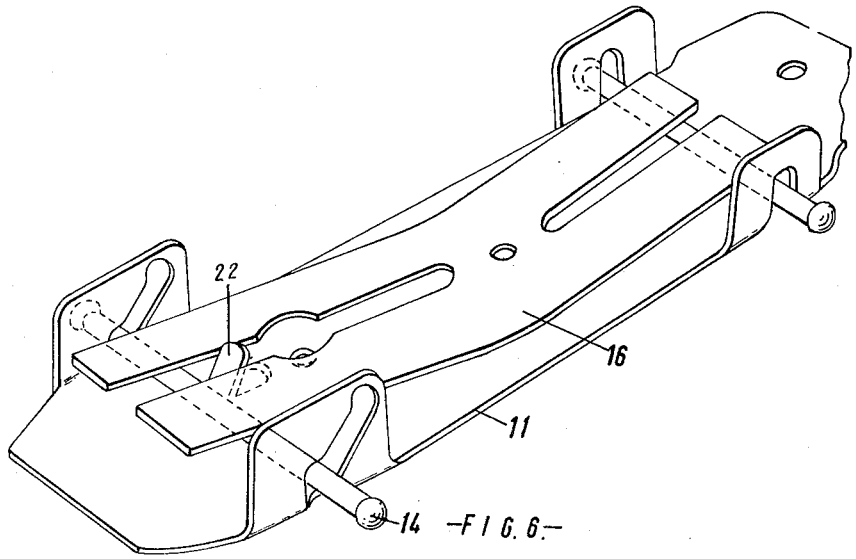
—FIG. 6.—
Inventor
CLAUDE BERGUERAND
By Robert C. Comstock
ATTORNEY

# United States Patent Office 3,063,194
Patented Nov. 13, 1962

3,063,194
MINIATURE TOY MOTOR VEHICLES
AXLE ARRANGEMENT
Claude Berguerand, Lagny, France, assignor to
Meccano Limited, Liverpool, England
Filed Oct. 27, 1960, Ser. No. 65,309
8 Claims. (Cl. 46—201)

The present invention concerns arrangements in miniature toy motor vehicles for permitting pivoting of an axle to provide a steering effect.

It is an object of the invention to provide axle support arrangements which will permit pivoting of an axle to provide a steering effect in response to a light downward pressure on the body of the vehicle at that side of the vehicle to which it is desired it should turn, the axle being restored to normal position for straight line movement of the vehicle upon release of the downward pressure.

According to the present invention the axle for at least the front wheels of a toy motor vehicle passes through slots in upstanding lugs on opposite sides of the vehicle floor plate, these slots having rearward upwardly inclined extensions, and a spring acts on the axle urging it to assume a normal position for straight line movement of the vehicle at the bottom of the inclined extensions of the slots.

The various features and advantages of the invention will be apparent from the following description of some exemplary embodiments thereof illustrated in the accompanying drawings, in which:

FIG. 1 is a side elevation of part of the floor of a toy vehicle embodying the invention;

FIG. 2 is a perspective view of the whole of the floor shown in part in FIG. 1;

FIG. 3 is an inverted perspective view of a detail of FIGS. 1 and 2;

FIG. 4 is a view similar to FIG. 3 showing a modification of the axle retaining spring;

FIG. 5 is a perspective view of a diecast floor of a vehicle embodying the invention; and FIG. 6 is a perspective view of a vehicle floor embodying a modification of the invention.

Referring to FIGS. 1 to 3, the vehicle floor comprises a sheet metal plate 11 bent to form upstanding lugs 12 and 13 which are slotted for the reception of the front and rear axles 14 and 15 respectively. The slots in the lugs 12 are each adapted to have a central depression in which the axle 14 is normally held in position for straight line movement of the vehicle by a blade spring 16 riveted or otherwise secured to the floor 11 at 17. The rear end of spring 16 overlies the rear axle 15 to provide a rear wheel springing of the vehicle. At its front end the spring 16, as shown in FIG. 3, has a hole to clear a spigot 18, by which the vehicle body (not shown) is mounted on the floor plate 11, and has two spaced lugs 19 which, as shown in FIG. 2, extend downwardly on either side of the centre of the axle 14.

The slots in the lugs 12 extend forwardly from the central depressions in a horizontal direction and extend rearwardly at an angle to the horizontal in an upward direction.

In response to a light downward pressure on one or other front side of the vehicle, as indicated by the arrow in FIG. 1, the floor is depressed until the axle 14 first assumes the dotted line position shown in the figure and then the end at which the pressure is applied moves rearwardly up the inclined portion of the slot. Correspondingly the other end of the axle moves forwardly along the horizontal portion of the slot in the lug on the other side of floor 11, the axle pivoting about the lugs 19 in the spring 16. If now the vehicle moves forwards or backwards whilst the light pressure is maintained the pivoted state of the axle will cause the vehicle to follow an arcuate path. As soon as the downward pressure is removed the spring 16 urges the rearwardly displaced end of the axle 14 down the inclined portion of the slot into the central position and the vehicle then moves in a straight line.

The axle retaining spring 16 shown in FIGS. 1 to 3 may be slotted longitudinally from each end as shown in FIG. 4 to provide individual spring limbs for the opposite ends of each of the axles 14 and 15. Part of the forward end slot of the spring 16 may be provided by the operation of cutting and bending up the lugs 19 shown in FIG. 3 or these lugs 19 may be replaced by lugs 20 bent up from the floor 11, as shown in FIG. 4, and fitting within the forward end slot in the spring 16.

Instead of pivoting the axle 14 between the lugs 19 of FIGS. 1 to 3 or the lugs 20 of FIG. 4 this axle can be pivoted between upstanding spigots 21 on a die cast floor member 11 as shown in FIG. 5.

A further modification is shown in FIG. 6 wherein the forwardly extending horizontal portions of the slots in lugs 12 are omitted and the axle 14 instead of fitting between lugs 19 or 20 or spigots 21 as shown in the earlier figures rest against a rearwardly inclined single lug 22. The uppermost ends of the slots in lugs 12 are formed with recesses tending to retain the axle ends in the upper positions when displaced by downward pressure on the vehicle body. In this case only one end of the axle moves, the pivoting being about the slot in lug 12 at the other end of the axle in each case.

The lug 22 can be replaced by a similarly shaped spigot in the case of a diecast floor member 11 and in either case the lug 22 or spigot fits within the slot in spring 16.

A further modification of all the embodiments described is to employ a spigot or spigots depending from the body of the vehicle to co-operate with the axle 14 in place of the lugs 19, 20 or 22 or the spigots 21.

I claim:

1. In a toy motor vehicle having at least one rear wheel and two transversely spaced front wheels; a generally horizontal floor plate, an upstanding lug at each side of said floor plate, each said lug having a slot, a portion of which is substantially horizontal and another portion of which is inclined upwardly, axle means extending laterally outwards through said slots in each said lug, a front wheel being mounted for rotation on said axle means outside each said lug, guide means for permitting a swinging movement of said axle means back and forth along each said slot, and spring means for urging said axle means down said slots towards said floor plate for straight line movement of the vehicle.

2. In a toy motor vehicle having at least one rear wheel and two transversely spaced front wheels; a generally horizontal floor plate, an upstanding lug at each side of said floor plate, each said lug having a slot, a portion of which is substantially horizontal and another portion of which is inclined upwardly, an axle carrying a front wheel at each of its ends and extending above the floor plate through said slots in each said lug, guide means for permitting a swinging movement of one end of said axle back and forth along the respective slot, and spring means for urging said axle down said slots towards said floor plate for straight line movement of the vehicle.

3. In a top motor vehicle having at least one rear wheel and two transversely spaced front wheels; a generally horizontal floor plate, an upstanding lug at each side of said floor plate, each said lug having a slot, a portion of which is substantially horizontal and another portion of which is inclined upwardly, an axle carrying a front wheel at each of its ends and extending above the floor plate through said slots in each said lug, a rearwardly and upwardly inclined guide intermediate said lugs for permitting a swinging movement of one end of said axle back and forth along the respective slot whilst the other end of said axle pivots about the lower end of the other slot, and spring means for urging said axle means down said slots towards said floor plate for straight line movement of the vehicle.

4. In a toy motor vehicle having at least one rear wheel and two transversely spaced front wheels; a generally horizontal floor plate, an upstanding lug at each side of said floor plate, each said lug being slotted in an upwardly and rearwardly inclined direction, each lug also being slotted forwardly in a horizontal direction as a continuation of the forward end of the inclined slot thereof, an axle carrying a front wheel at each of its ends and extending above the floor plate through the slots in each said lug, a front wheel being mounted for rotation on said axle outside each said lug, guide means for permitting a swinging movement of said axle about a position between said lugs whereby one end of said axle can move backwardly and upwardly along its respective slot whilst the other end simultaneously moves forwardly along the respective horizontal slot and vice versa, and spring means for urging said axle down said slots towards said floor plate for straight line movement of the vehicle.

5. A structure according to claim 4 wherein the spring means is constituted by a blade spring secured to the floor plate intermediate the ends of said spring, said spring ends respectively overlying the said front axle and a rear axle of the vehicle.

6. A structure according to claim 2 wherein said guide means acts as a pivot means for the center of the said axle.

7. A structure according to claim 4 including a pair of spaced upwardly extending spigots formed on the face of said floor plate and lying respectively in front of and behind said axle and acting as a pivot means therefor.

8. A structure according to claim 1 wherein the spring means is a blade bifurcated over at least its forward end, the limits of the bifurcation lying at opposite sides of the guide means.

References Cited in the file of this patent

UNITED STATES PATENTS

| | | |
|---|---|---|
| 2,216,497 | McHenry | Oct. 1, 1940 |
| 2,749,662 | Bottleman | June 12, 1956 |